United States Patent [19]

Danihel

[11] Patent Number: 4,598,547
[45] Date of Patent: Jul. 8, 1986

[54] KINETIC ENERGY TRANSDUCING SYSTEM

[76] Inventor: Michael Danihel, 639 S. Irena, Redondo Beach, Calif. 90277

[21] Appl. No.: 740,247

[22] Filed: Jun. 3, 1985

[51] Int. Cl.⁴ .............................................. F03B 7/12
[52] U.S. Cl. ...................................... 60/507; 60/504; 60/506; 440/9
[58] Field of Search ................. 60/497, 499, 500, 504, 60/505, 506, 507; 290/421, 53; 417/331, 332; 440/9

[56] References Cited

U.S. PATENT DOCUMENTS

| | | | |
|---|---|---|---|
| 1,292,303 | 1/1919 | Garwood | 60/504 |
| 4,319,454 | 3/1982 | Lucia | 60/506 |

FOREIGN PATENT DOCUMENTS

| | | | |
|---|---|---|---|
| 21281 | 8/1929 | Netherlands | 60/505 |

*Primary Examiner*—Stephen F. Husar
*Attorney, Agent, or Firm*—Charles H. Thomas

[57] ABSTRACT

A device is constructed to convert wave energy to drive an output shaft in rotation. The output shaft can be connected to a nautical vehicle propulsion system or to a power generation system. A float rides upon the undulating surface of a body of water and is connected by a float lever arm which extends radially from a rocker shaft that is rotatably mounted in a frame located on a vessel or platform on a body of water. The rocker shaft undergoes reciprocating arcuate movement in response to movement of the float upon the undulating water surface. A pair of unidirectional clutch mechanisms are coupled to the rocker shaft and to a drive shaft which is also rotatably mounted on the frame. The unidirectional clutches are alternatively connected to turn the drive shaft in a single direction of rotation responsive to movement of the rocker shaft in both directions of rotation. A plurality of floats connected through separate clutch mechanisms to a single drive shaft, or to a plurality of drive shafts, may be used to convert kinetic wave motion to useful mechanical energy.

9 Claims, 8 Drawing Figures

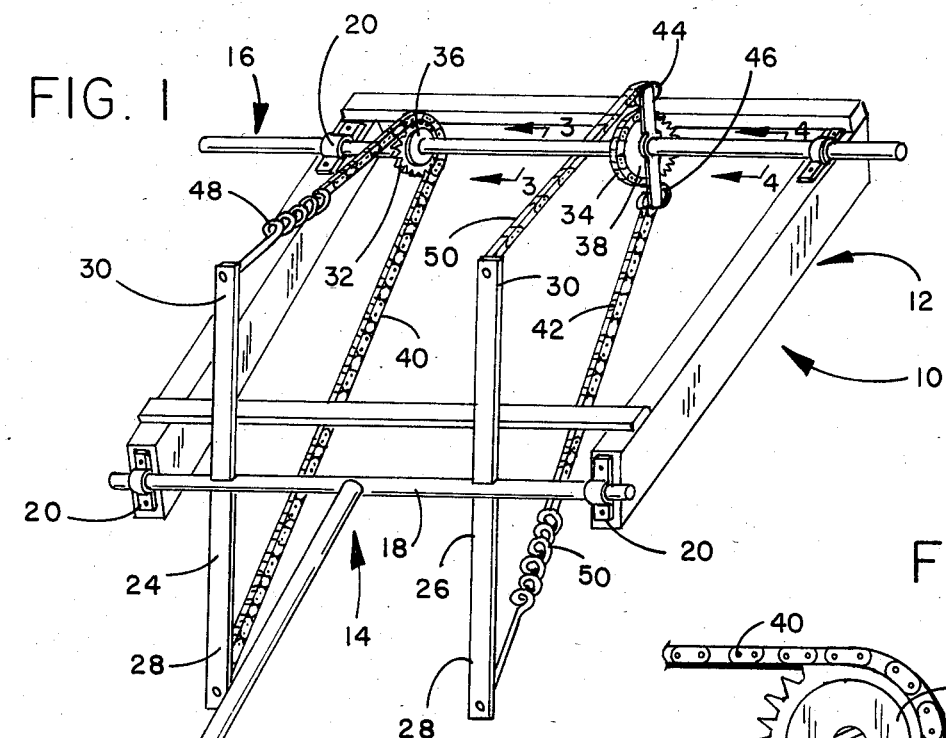
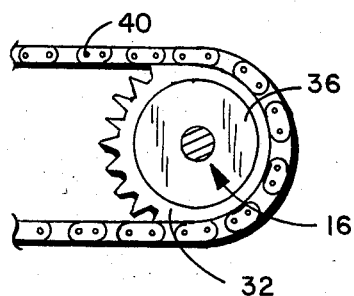
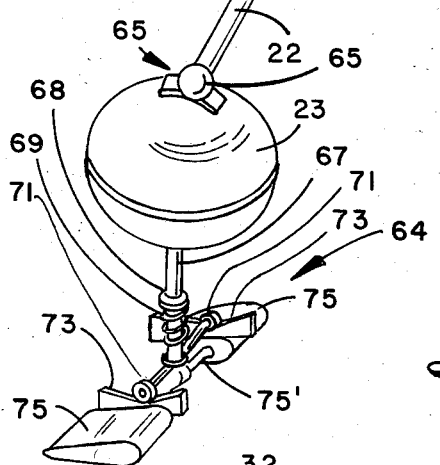
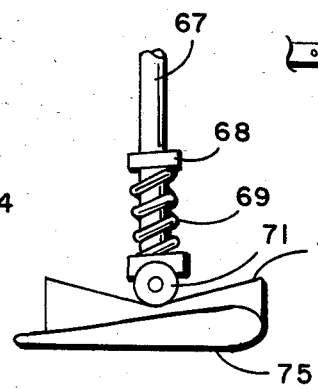
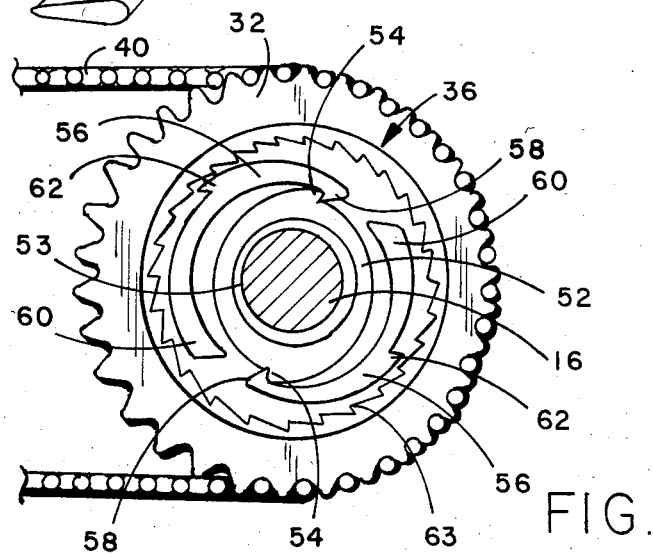
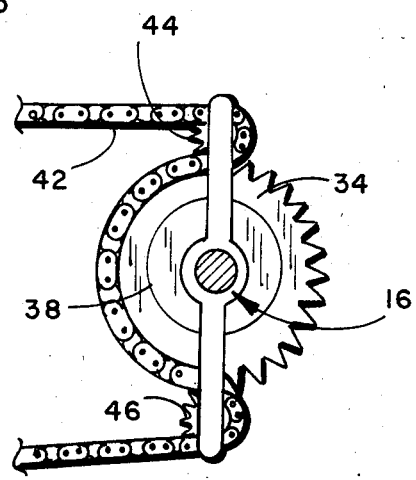
FIG. 1  FIG. 2  FIG. 3  FIG. 4  FIG. 5

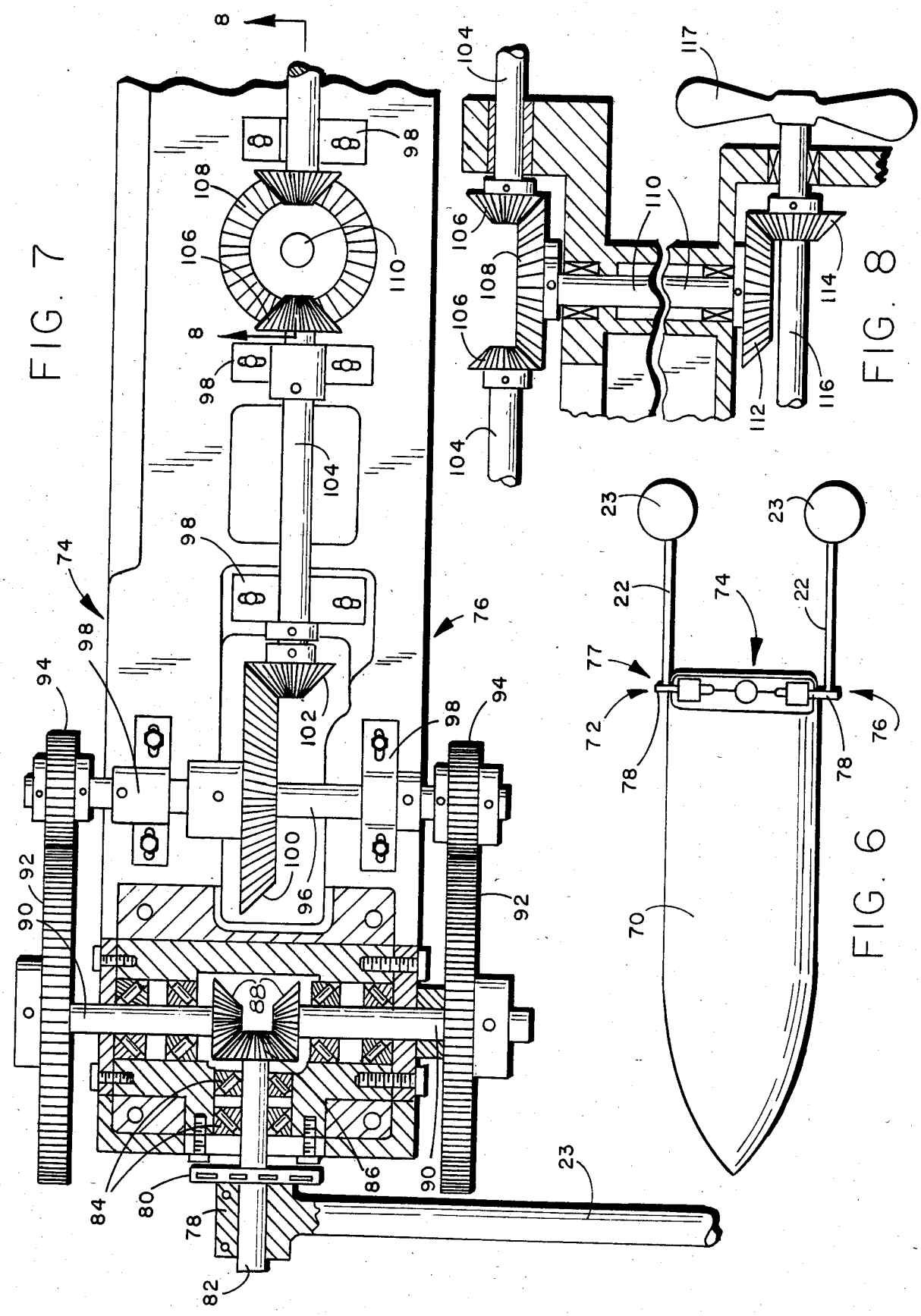

KINETIC ENERGY TRANSDUCING SYSTEM

BACKGROUND OF THE INVENTION

1. Field of the Invention

The present invention relates to a system for converting the motion of waves in a body of water to a useful source of energy.

2. Description of the Prior Art

Wave energy transducers have been devised to attempt to extract the kinetic energy of wave motion on the undulating surface of a body of water and convert that energy to a useful form. Energy recovered in this manner may be used for propelling a nautical vessel or generating electrical power. Such prior art systems have heretofore been commercially unsuccessful due to the small amount of useful energy obtained from the motion of waves. Such conventional systems have served only as objects of curiosity and have not assumed a meaningful role in utilizing the tremendous amount of kinetic energy available and present in wave motion on the surfaces of bodies of water.

SUMMARY OF THE INVENTION

The present invention is a device for converting wave energy to mechanical motion comprising a frame, mounted upon a vessel or platform in a body of water, and at least one wave energy transducer. A wave energy transducer, according to the invention, employs a float which rides upon the undulating surface of a body of water. A rocker shaft is rotatably mounted within the frame and is connected to the float by means of a rocker arm. The rocker shaft turns in response to movement of the float which rises and falls upon the undulating surface of a body of water. A pair of unidirectional clutch mechanisms is coupled to the rocker shaft, and a drive shaft is rotatably mounted upon the frame. The drive shaft is connected to the clutch mechanisms to turn in a single direction of rotation, responsive to the alternative engagement of each of the clutch mechanism and turning movement of the rocker shaft in both direction of rotation. Any number of floats and clutch mechanisms associated therewith may be employed to additively provide a driving, rotary motion to a common output shaft. The energy from each float may be provided through a common drive shaft, or through different drive shafts coupled to a common output shaft.

Preferably a wave energy transducer according to the invention is provided with at least two floats and four clutch mechanisms, two associated with each float. The floats and associated clutch mechanisms are arranged in pairs with the two clutch mechanisms in each pair coupled to drive a common output shaft responsive to float movement in opposite directions upon the undulating water surface. A more uniform rotational speed of the output shaft is achieved by providing floats connected to a common output in this fashion.

The wave energy transducing system of the invention may be used in any body of water in which the water surface undulates. Undulation is typically caused by wave action, but the system of the invention is equally applicable in situations where undulation results from some other cause, such as by water turbulence of the type that occurs in rapids and at the foot of a cascade of water. The undulating wave energy which is converted to rotary motion of an output shaft according to the invention may be used directly, as for example to drive the propeller shaft of a nautical vessel. Alternatively, the rotary output of the output shaft may be used to generate power as in electrical power generation. The system of the invention may be mounted on floating, permanently manned platforms on the open sea, or upon platforms supported upon land at the waters edge, or upon the sea floor. The wave energy trandsucer system may also be mounted upon pier-like structures with a muliptlicity of arms extending radially outwardly with each arm carrying a float to ride upon the surface of the water.

The wave energy transducer system may also be utilized on existing, anchored buoys to produce electrical energy for permanent beacon lights which aid navigation at night in coastal areas. A transducer system according to the invention may also be used as a hydraulic or pneumatic pump driver. In this case the output shaft drives a pneumatic or hydraulic pump. The air or liquid is compressed in a surge tank or bladder and then is used to drive either an air or a hydraulic motor.

The invention may be described with greater clarity and particularity by reference to the accompanying drawings.

DESCRIPTION OF THE DRAWINGS

FIG. 1 is a perspective view of one embodiment of a device according to the invention.

FIG. 2 is a side elevational detail of the float hydrofoil system in the device of FIG. 1.

Fig. 3 is an elevational view of one of the drive sprockets taken along the lines 3—3 in FIG. 1.

FIG. 4 is an elevational view of the other drive sprocket taken along the lines 4—4 in FIG. 1.

FIG. 5 illustrates the operation of a clutch mechanism of the type employed in the device of FIG. 1.

FIG. 6 is a diagramatic plan view of a nautical vessel employing a propulsion system according to an improved version of the invention.

FIG. 7 is a top plan view, partially in section, illustrating a portion of the propulsion system employed in FIG. 6 in greater detail.

FIG. 8 is a sectional elevational detail taken along the lines 8—8 of FIG. 7.

DESCRIPTION OF THE EMBODIMENTS

FIG. 1 illustrates a wave energy transducer 10. The transducer 10 has a generally horizontally disposed, rectangularly shaped open frame 12. A rocker mechanism 14 is rotatably secured to one end of the frame 12, and a longitudinal drive shaft 16 is rotatably secured to the opposite end of frame 12. The rocker mechanism 14 includes a longitudinal rocker shaft 18 rotatably mounted by means of pillow blocks 20 to the frame 12. The rocker mechanism 14 also includes a float mounting arm 22 projecting radially from the rocker shaft 18 to carry a float 23, and a pair of parallel crank levers 24 and 26 oriented in a plane disposed at right angles to the float mounting arm 22 so that the crank levers 24 and 26, together with the central portion of the rocker shaft 18 form a generally H-shaped structure. Each of the crank levers 24 and 26 has first and second diverging arms 28 and 30, respectively.

The drive shaft 16 is mounted by means of pillow blocks 20 and resides in horizontal, longitudinal disposition parallel to the rocker shaft 18. A pair of drive sprockets 32 and 34 are mounted upon the drive shaft 16 by a pair of one-way clutches 36 and 38. The clutches 36 and 38 are both disposed on the drive shaft 16. The clutch 36 carries the sprocket 32 while the clutch 38 carries the sprocket 34.

A first chain 40 has opposite ends which are secured to the arms 28 and 30 of the crank lever 24. The chain 40 is engaged with the sprocket 32 to turn the sprocket 32 to engage clutch 36 associated therewith when the float 23 moves to rotate the rocker shaft 18 in one direction. A chain 42 has opposite ends which are secured to the arms 28 and 30 of the other crank lever 26. The chain 42 is engaged with the sprocket 34 to engage the clutch 38 associated therewith when the float 23 moves to rotate the rocker shaft 18 in an opposite direction.

As illustrated in FIG. 3, the chain 40 is looped over the sprocket 32 and is engaged with the side of the sprocket 32 opposite the rocker shaft 18. As illustrated in FIG. 4, the chain 42 is looped over a pair of idler sprockets 44 and 46 which are disposed above and below the sprocket 34 on diametrically opposite sides thereof. The chain 42 is engaged with the side of the sprocket 34 closest to the rocker shaft 18.

A first spring tensioning means in the form of a coil spring 48 is connected to the chain 40 and to the arm 30 of the crank lever 24. A second spring tensioning means in the form of a coil spring 50 is connected to the chain 42 and to the arm 28 of the crank lever 26.

The operation of the clutch mechanisms employed is depicted in FIG. 5. FIG. 5 depicts the clutch mechanism 36. In the clutch mechanism 36 there is a hub 52 which is journaled by bearings 53 on the drive shaft 16. The hub 52 is rigidly joined to and rotates with the sprocket 32. The hub 52 is of a generally annular configuration, but has a pair of spiral cam lobes which terminate in oppositely disposed catches 54. A pair of arculately shaped pawls 56 are located radially outwardly from the hub 52. Each of the pawls 56 has a narrow end which terminates in a rachet hook 58. The thickness of the pawls 56 increases from the ratchet hooks 58 toward the opposite ends 60. A radially outwardly directed catch 62 is defined on the outer periphery of each of the pawls 56. The catches 62 are configured to engage with corresponding teeth in the annular ratchet ring 63 disposed radially outwardly from the pawls 56. The ratchet ring 63 is keyed to the drive shaft 16. Engagement of the pawl catches 62 with the rachet ring teeth occurs when the sprocket 32 rotates clockwise, as viewed in FIGS. 3 and 5.

The clutch mechanism 38 is of identical construction to the clutch mechanism 36. The ratchet ring of the clutch mechanism 38 will likewise be engaged with the hub of the clutch mechanism 38 only when the sprocket 34 turns in a clockwise direction, as viewed in FIG. 4. However, the chains 40 and 42 turn the sprockets 32 and 34 in opposite directions with each movement of the float 23. Therefore, only one of the clutch mechanisms is engaged at any one time.

The wave energy transducer 10 functions in the following manner. When an undulation in the surface of the water upon which the float 23 rides drops the float 23 vertically downward, the float mounting arm 22 turns the rocker shaft 18. The crank levers 24 and 26 also turn so that the first ends 28 thereof rotate toward the drive shaft 16 while the second ends 30 thereof are rotated away from the drive shaft 16. The crank lever 24 thereby pulls on the chain 42 to turn the sprocket 34 clockwise as viewed in FIGS. 3 and 4. As previously described, a clockwise rotation of the sprocket 34 will engage the clutch mechanism 38 to turn the drive shaft 16 in a clockwise direction as well. At the same time, the chain 40 will rotate the sprocket 32 in a counter-clockwise direction, since the chain 40 is engaged with the sprocket 32 on the side thereof farthest from the rocker shaft 18. However, when the sprocket 32 is rotated in a counter-clockwise direction, the hub 52 and the ratchet ring 63 thereof are disengaged, so that the sprocket 32 does not retard rotation of the drive shaft 16.

When the float 23 moves upwardly on a wave on the undulating surface of a body of water, the rocker shaft 18 will be rotated in the opposite direction to swing the first arms 28 of the crank levers 24 and 26 away from the drive shaft 16. The second arms 30 will rotate toward the drive shaft 16. With this motion the chain 40 will turn the sprocket 32 in a clockwise direction as viewed in FIG. 5. This will engage the clutch mechanism 36 so that the hub 52 of the clutch mechanism 36 will turn the ratchet ring 63 thereof, thereby imparting clockwise rotation to the drive shaft 16. At the same time, the chain 42 will rotate the sprocket 34 in a counter-clockwise direction, thus disengaging the clutch mechanism 38.

As the float 23 rises and falls with the undulating surface of the water upon which it rides, the rocker shaft 18 will rock back and forth in an oscillating arcuate path. This oscillating rocking motion of the rocker shaft 18 is converted to a unidirectional rotary motion as it is transmitted to the drive shaft 16. It is evident that the drive shaft 16 of the embodiment of the invention depicted in FIG. 1 will always be turned in a clockwise direction, as viewed in FIGS. 3, 4 and 5.

The coil springs 48 and 50 ensure that any slack in the chains 40 and 42, respectively, is taken up. The coil springs 48 and 50 are located on the slack sides of their respective chains. The driving forces imparted by the chains 40 and 42 to the drive shaft 16 are always transmitted through the inextensible portions of the chains, opposite the coil springs 48 and 50.

In the embodiment of the FIGS. 1 through 5, the sprockets 32 and 34 both transmit driving force to the same drive shaft 16, which serves as a drive output shaft as well. The drive shaft 16 will always be rotated in a clockwise direction as viewed in FIGS. 3 through 5. The drive shaft 16 can be coupled to an electrical generating system, or to a nautical vessel propulsion system, through conventional mechanical gearing, chains, belts or other linkages.

When the wave energy transducer 10 is employed as a power generator in a vessel propulsion system, it is quite desirable for the underside of the float 23 to be formed with a hydrofoil system 64. By using a hydrofoil system 64, drag on the float 23 is minimized as the vessel is propelled through the water. The float mounting arm 22 is permanently fixed to the hemispherical upper portion of the float 23.

The operation of the hydrofoil system 64 may be described with reference to FIGS. 1 and 2. The hydrofoil system 64 includes a vertical shaft 67 extending downwardly from the bottom of the float 23. The shaft 67 includes a stop 68 for a coil spring 69. The stop 68 is longitudinally immobilized on the shaft 67. The opposite end of the coil spring 69 bears against a collar slideably disposed on the shaft 67 and carrying a transverse axle upon the ends of which rollers 71 are rotatably mounted. The rollers 71 ride upon V-shaped centering tracks 73 which are rigidly secured to hydrofoil wings 75 on either side of the shaft 67. The hydrofoil wings 75 are connected parallel to each other on the ends of a transverse connecting rod 75' that in turn is carried within a transverse, coaxial sleeve at the end of the shaft 67. The compressed coil spring 69 acts upon the rollers 71 to normally carry the hydrofoil wings 75 in a horizontal orientation.

The hydrofoil system 64 operates in the following manner. The hydrofoil wings 75 are oriented to face the direction of movement of the vessel to be propelled, which is to the right as viewed in FIG. 2. With an upsurge tending to raise the float 23, the hydrofoil wings 75 will tend to twist at an angle counter-clockwise, as viewed in FIG. 2, thus forcing the rollers 71 up the right-hand side of the track 73. This movement raises the collar carrying the rollers 71 on the shaft 67, thereby compressing the spring 69 slightly. The disposition of the hydrofoil wings 75 upwardly and to the right with the float 28 moving upwardly acts against the resisting force of the water to tend to propel the foils 75 forwardly to the right. This reduces the resistance of movement of the system through the water. When the force tending to raise the float 23 ceases, the coil spring 69 will drive the rollers 71 back down the track 73, thereby returning the foil wings 75 to a horizontal disposition.

Similarly, when a force acts upon the float 23 to cause it to move downwardly, the hydrofoil wings 75 will tilt in a clockwise direction, as viewed in FIG. 2. This will cause the rollers 71 to ride up the left hand side of the track 73, slightly compressing the coil spring 69. The disposition of the hydrofoil wings 75 downwardly and to the right with the float 23 moving downwardly likewise acts against the resisting force of the water to tend to propel the foils 75 forwardly to the right, as viewed in FIG. 2.

FIG. 6 illustrates an improved version of the invention over the embodiment of FIGS. 1-5 as employed in a propulsion system for a boat 70. All of the chains and sprockets of the embodiment of FIGS. 1-5 are replaced by a precise gear system. This prevents any problem which might result from the chains stretching. The compactness of the embodiment of FIGS. 6-8 allows better protection against the corrosive elements of the sea. The transducer arms are rearranged to a more favorable geometric configration, instead of the radially outward disposition in the embodiment of FIGS. 1-5. In the embodiment of FIGS. 1-5 the arms and rocker shaft are subjected to excessive stress and possible damage due to forward motion. In the embodiment of FIGS. 6-8 the arms are arranged to trail behind a vessel, or when used on the sides of a vessel the arms are arranged parallel to the direction of movement of the vessel. This limits side thrust against the arms and rocker shaft. In the embodiment of FIG. 6 the boat 70 includes a device 72, according to the invention, to convert wave energy to mechanical motion. The device 72 includes a frame 74 and a pair of wave energy transducers 76 and 77. The transducers 76 and 77 employ a pair of floats 23 carried by float mounting arms 22. The floats 23 ride on the undulating surface of a body of water in the manner previously described. Each of the float mounting arms 22 is connected to a hollow, annular rocker shaft 78. The rocker shafts 78 are rotatably mounted relative to the frame 74. The rocker shafts 78 are connected to the floats 23 by rocker arms 22 to turn in response to movement of the floats 23 upon the undulating water surface.

The port side of the device 72 is illustrated in detail in FIG. 7. An overload clutch mechanism 80 is coupled to the rocker arm shaft 78. The overload clutch mechanism 80 couples the rocker arm shaft 78 to a coaxial drive shaft 82 unless excessive resistive force is encountered. In this event the clutch mechanism 80 will decouple the rocker arm shaft 78 from the drive shaft 82. The coaxial drive shaft 82 is rotatably mounted by bearings 84 within the frame 74.

The drive shaft 82 terminates in a bevel pinion 86. The bevel pinion 86 is meshed with corresponding bevel gears 88 which are mounted on the ends of a pair of intermediate shafts 90 disposed at right angles to the drive shaft 82. The intermediate shafts 90 are journaled within the frame 74 and are connected to large spur gears 92. The shafts 90 turn in opposite directions of rotation as the bevel pinion 86 rotates in response to movement of the rocker arm shaft 78.

The spur gears 92, in turn, are meshed with external gear teeth on the outsides of clutch mechanisms 94. The external gear teeth on the clutches 94 are provided in place of the sprocket teeth used in the clutch of FIG. 5, but otherwise the clutches 94 operate in the same manner as the clutch of FIG. 5.

Each of the clutches 94 is alternatively engaged, depending upon the direction of rotation of the spur gears 92. As in the embodiment of FIGS. 1-5, the clutches 94 are alternatively engaged to an intermediate drive shaft 96, depending upon the direction of rotation of the rocker arm shaft 78. When the rocker arm shaft 78 turns in a direction which engages one of the clutches 94, the other clutch 94 is disengaged. The shaft 96 is journaled in pillow blocks 98 relative to the frame 74. The intermediate drive shaft 96 thereby turns in a single direction of rotation responsive to alternative engagement of each of the clutch mechanisms 94 and turning movement of the rocker arm shaft 78, as described in association with the embodiment of FIGS. 1-5.

Another bevel gear 100 is mounted on the intermediate shaft 96 and is meshed with a further bevel gear 102 mounted on one end of another shaft 104. The shaft 104 is also mounted by pillow blocks 98 relative to the frame 74, and carries another bevel gear 106 on the end opposite the end at which the gear 102 is mounted. The bevel gear 106 is meshed with a further annular bevel gear 108 secured to a vertical axle 110. The axle 110 extends vertically downward as depicted in FIG. 8, and turns a further bevel gear 112. The bevel gear 112 is meshed with another bevel gear 114 on an output shaft 116. In the vessel propulsion system depicted, a propeller 117 is mounted on the output shaft 116. The output shaft 116 is journaled in bearings relative to the frame 74. The gear system depicted in FIGS. 7 and 8 is interposed between the ouput shaft 116 and the drive shaft 82 to control the speed of rotation of the output shaft 116 relative to speed of rotation of the drive shaft 82.

In the preferred embodiment depicted in FIGS. 6-8, the device 72 for converting wave energy to mechanical motion employs a drive shaft 82 for each of two rocker shafts 78 rotatably mounted in the frame 74 on opposite sides of the boat 70. Each drive shaft 82 is connected to dual clutch mechanisms 94 for the rocker shaft 78 associated therewith. Each intermediate drive shaft 96 rotates in in a single direction of rotation in response to rocking movement of its associated rocker shaft. Moreover, both of the intermediate drive shafts 96 are connected as driving inputs to a common output shaft 116, in the manner depicted in FIGS. 7 and 8. The device 72 thereby employs a pair of wave energy transducers 76 and 77 coupled to the same frame 74. The driving outputs are provided to the same common output shaft 116.

The pairs of unidirectional clutches 94 in each of the transducers 76 and 77 are arranged to effectuate engagement of their respective rocker shafts 78 to their respective intermediate drive shafts 96 in response to movement of their respective floats 23 in opposite directions upon the undulating water surface. By arranging the transducers 76 and 77 to provide a driving input to a common output shaft upon movement of the floats thereof in opposite directions, rotation of the output shaft 116 will be at a more uniform speed.

It can be seen that increased power can be provided to a common output shaft 116 by merely adding additional tranducers with driving inputs to the same output shaft 116. Preferably, such additional transducers are provided in pairs and are of the type depicted in FIGS. 6 and 7. Additional pairs of transducers are provided and can be connected in tandem to provide inputs to the ouput shaft 116 until the necessary power output is achieved.

Undoubtedly, numerous variations and modifications of the invention become readily apparent to those familiar with wave energy transducers. For example, unidirectional roller clutches can be employed in place of the type of clutches utilized in the embodiments illustrated. Also, while propulsion systems with only one and two floats have been depicted in the drawing, it is to be understood that any number of floats can be employed and coupled to a common output drive in order to increase the power output of the system. Accordingly, the scope of the invention should not be construed as limited to the specific embodiments depicted and described, but rather is defined in the claims appended hereto.

I claim:

1. A device for converting wave energy to mechanical motion comprising: a frame, at least one wave energy transducer each of which has a float to ride upon the undulating surface of a body of water, a rocker shaft rotatably mounted in said frame and connected to said float by a rocker arm to turn in response to movement of said float upon said undulating water surface, a pair of unidirectional clutch mechanisms coupled to said rocker shaft, a drive shaft rotatably mounted on said frame and connected to said clutch mechanisms to turn in a single direction of rotation responsive to alternative engagement of said clutch mechanisms therewith and turning movement of said rocker shaft in both directions of rotation, and a hydrofoil system for each float including a vertical shaft extending downwardly from the bottom of each float, a transverse rod which is rotatably coupled to said vertical shaft, a pair of hydrofoil wings secured to said transverse rod on opposite sides of said vertical shaft, and means for centering said hydrofoil wings acting between said vertical shaft and said transverse rod to urge said hydrofoil wings toward horizontal orientation.

2. A device according to claim 1 comprising a plurality of wave energy transducers as aforesaid and a common output shaft rotatably mounted in said frame to receive driving inputs from all of said drive shafts.

3. A device according to claim 2 further comprising gear systems interposed between said output shaft and said drive shafts to control the ratio of speed of rotation of said output shaft to speed of rotation of said drive shafts.

4. A device according to claim 1 further comprising at least one pair of wave energy transducers and an output shaft rotatably mounted in said frame to receive driving inputs from said drive shafts in each pair of transducers.

5. A device for converting wave energy to mechanical motion comprising: at least one float disposed to ride upon the undulating surface of a body of water, a float lever arm extending from each said float, a frame, a rocker shaft for each of said floats rotatably mounted in said frame and connected to said float lever arm, a pair of unidirectional clutch mechanisms connected to each of said rocker shafts, a drive shaft for each of said rocker shafts rotatably mounted in said frame and connected to the pair of clutch mechanisms for the rocker shaft associated therewith to rotate in a single direction of rotation in response to rocking movement of said rocker shaft, and a hydrofoil system including a vertical shaft extending downwardly from the bottom of each float, a transverse rod rotatably coupled to each vertical shaft, a pair of hydrofoil wings secured to each transverse rod on opposite sides of the vertical shaft associated therewith, and means for centering said hydrofoil wings of each float acting between said vertical shafts and said transverse rods associated therewith to urge said hydrofoil wings toward horizontal oprientation.

6. A device according to claim 5 comprising a plurality of floats, lever arms, rocker shafts, pairs of clutches and drive shafts as aforesaid wherein all of said drive shafts are connected as driving inputs to a common output shaft rotatably mounted in said frame.

7. A wave energy transducer comprising: mounting frame means, rocker means including a rocker shaft mounted on said frame means, a float, a float mounting arm extending radially from said rocker shaft, and a pair of parallel crank levers each having a pair of first and second diverging arms radiating from said rocker shaft, a drive shaft rotatably mounted on said frame means parallel to said rocker shaft, a pair of drive sprockets, a pair of one-way clutches disposed on said drive shaft each carrying one of said drive sprockets, a first chain secured at opposite ends to the arms of one of said crank levers and and a second spring tensioning means connected to said second chain and to said second arm of said other of said crank levers engaged with a first one of said sprockets to turn said first sprocket to engage the clutch associated therewith when said float moves to rotate said rocker shaft in one direction, and a second chain secured at its opposite ends to the arms of the other of said crank levers and engaged with a second of said sprockets to turn said second sprocket to engage the clutch associated therewith when said float moves to rotate said rocker shaft in an opposite direction.

8. A transducer according to claim 7 further characterized in said first chain is looped over said first sprocket and is engaged with said first sprocket on the side of said sprocket opposite said rocker shaft and said second chain is looped over idler sprockets disposed on diametrically opposite sides of said second sprocket and is engaged with said second sprocket on the side of said second sprocket closest to said rocker shaft.

9. A transducer according to claim 8 further comprising of first spring tensioning means connected to said first chain and to said first arm of said one of said crank levers.

* * * * *